US011570575B2

(12) United States Patent
Ratzlaff

(10) Patent No.: US 11,570,575 B2
(45) Date of Patent: Jan. 31, 2023

(54) TECHNIQUES FOR ORGANIZING VEHICLE PARKING

(71) Applicant: Jason Ratzlaff, Paso Robles, CA (US)

(72) Inventor: Jason Ratzlaff, Paso Robles, CA (US)

( * ) Notice: Subject to any disclaimer, the term of this patent is extended or adjusted under 35 U.S.C. 154(b) by 0 days.

(21) Appl. No.: 17/064,477

(22) Filed: Oct. 6, 2020

(65) Prior Publication Data

US 2022/0109948 A1 Apr. 7, 2022

(51) Int. Cl.
*H04W 4/02* (2018.01)
*G08G 1/14* (2006.01)

(52) U.S. Cl.
CPC ............ *H04W 4/023* (2013.01); *G08G 1/144* (2013.01); *G08G 1/148* (2013.01); *H04W 4/027* (2013.01)

(58) Field of Classification Search
None
See application file for complete search history.

(56) References Cited

U.S. PATENT DOCUMENTS

| 8,237,591 | B2 | 8/2012 | Holcomb | |
|---|---|---|---|---|
| 8,432,297 | B2 * | 4/2013 | Sonnabend | ............ G08G 1/147 340/932.2 |
| 8,498,805 | B2 | 7/2013 | Joong | |
| 8,918,272 | B2 | 12/2014 | Demerchant | |
| 8,976,063 | B1 | 3/2015 | Hawkins | |
| 9,019,129 | B2 | 4/2015 | Skinder | |
| 9,188,445 | B2 | 11/2015 | Ichinokawa | |
| 9,562,769 | B2 | 2/2017 | Korn | |
| 9,715,816 | B1 | 7/2017 | Adler | |
| 10,013,817 | B2 | 7/2018 | Hasenfratz | |
| 10,539,586 | B2 | 1/2020 | Grokop | |
| 10,657,732 | B2 * | 5/2020 | Wang | ..................... G08G 1/143 |
| 2014/0256258 | A1 | 9/2014 | Deluca | |
| 2015/0177362 | A1 | 6/2015 | Gutierrez | |
| 2016/0117866 | A1 * | 4/2016 | Stancato | ................ G07B 15/00 705/13 |

(Continued)

OTHER PUBLICATIONS

Camberi, Parkify—Where is my car?; Dec. 26, 2019; Retrieved Apr. 26, 2020 at https://play.google.com/store/apps/details?id=com.whereismycar&hl=en.

(Continued)

*Primary Examiner* — Adolf Dsouza
(74) *Attorney, Agent, or Firm* — Fitch, Even, Tabin & Flannery LLP

(57) ABSTRACT

A parking system may include a number of parking locations, where the availability of each parking location may be tracked based on detection of whether a vehicle is in the parking location. Accordingly, a parking system may organize parking locations based on availability and unavailability. In some cases, mobile device sensors may be used to determine whether a mobile device has left the vehicle in the parking location (e.g., and thus the parking location is still unavailable) or whether the mobile device has left the parking location in the vehicle (e.g., and thus the parking location is now available). In some cases, the parking system may organize available and unavailable parking locations, facilitate user listing of parking locations, track of available and unavailable parking locations, and track different characteristics of different parking locations (e.g., such as location, size, cost, availability, etc.), among other examples.

20 Claims, 9 Drawing Sheets

(56) References Cited

U.S. PATENT DOCUMENTS

2018/0211538 A1* 7/2018 Kadry .................. G08G 1/168

OTHER PUBLICATIONS

Deploy; "Anchor Pointer Compass GPS"; Pleeq Software; Retrieved Apr. 26, 2020 at https://apps.apple.com/us/app/anchor-pointer-parked-car-finder/id791684332.

Ellis et al; "Identifying Active Travel Behaviors in Challenging Environments using GPS, Accelerometers, and Machine Learning Algorithms"; Frontiers in Public Health vol. 2, Article 36; Apr. 2014; Retrieved at https://www.researchgate.net/publication/262055313.

Everyday Odyssey, Parking Pin—Automatic GPS Parking Tracker; 2013; Retrieved Apr. 26, 2020 at https://apps.apple.com/us/app/parking-pin-automatic-gps-parking-spot-tracker-map/id767796953.

Liu et al; "iParking: An intelligen Indoor Location-Based Smartphone Parking Service"; Sensors 12, No. 11: 14612-14629; Nov. 2012; www.mdpi.com/journal/sensors.

Ma et al; "Updector: Sensing Parking/Unparking Activities using Smartphones"; Proceedings of the 7th ACM SIGSPATIAL International Workshop on Computational Transportation Science; Nov. 4, 2014; pp. 76-85; Retrieved at https://dl.acm.org/doi/pdf/10.1145/2674918.2674929.

Rinne et al; "Mobile Crowdsensing of Parking Space Using Geofencing and Activity Recognition"; 10th ITS European Congress, Helsinki, Finland; Jun. 2014; pp. 16-19; Retrieved at https://research.aalto.fi/files/2574946/Mobile_crowdsensing_of_parking_space_using_geofencing_and_activity_recognition_final.pdf.

* cited by examiner

TECHNIQUES FOR ORGANIZING VEHICLE PARKING

BACKGROUND OF THE INVENTION

1. Field of the Invention

The present invention relates generally to vehicle parking, and more specifically to detecting parking of a vehicle.

2. Discussion of the Related Art

Various systems and processes are known in the art for vehicle parking.

Efficient systems for organizing availability of vehicle parking becomes increasingly important as population grows, vehicle usage increases, cites densify, etc. Cost considerations, space availability, and general efficiency of a parking system may be weighed in the adoption of a particular parking system.

Many parking systems include a given parking area (e.g., a parking lot, a parking garage, etc.) that includes a number of vehicle stalls (e.g., parking locations). However, such systems may have various limitations including the amount of space available (e.g., in a downtown area) and the usage efficiency of the space available (e.g., as usage of individual parking stalls may not be tracked or organized, as vehicle stalls may be established as a certain dimension some vehicles may not be compatible with, etc.).

SUMMARY

Generally, the techniques described herein provide for improved detection of the parking of a vehicle (e.g., improved detection of whether a vehicle is in a parking location or has left a parking location). For instance, a parking system may include a number of parking locations, where the availability of each parking location may be tracked based on detection of whether a vehicle is in the parking location. Accordingly, a parking system may organize parking locations based on availability and unavailability. Various embodiments of the present disclosure may include usage of device sensors (e.g., a tilt/inertia sensor, global positioning service (GPS) sensors, etc.) to determine whether a device (e.g., a mobile computing device) has left the vehicle in the parking location (e.g., and thus the parking location is still unavailable) or whether the device has left the parking location in the vehicle (e.g., and thus the parking location is now available). Various embodiments of the present disclosure may include organizing available and unavailable parking locations, including user listing of parking locations, tracking of available and unavailable parking locations, as well as tracking of different characteristics of different parking locations (e.g., such as location, size, cost, availability, etc.).

A method, apparatus, and non-transitory computer readable medium for detecting parking of a vehicle are described. Embodiments of the method, apparatus, and non-transitory computer readable medium are configured to select one of at least one parking locations, check availability of the one of the at least one parking locations for whether the one of the at least one parking locations is available, display, when the one of the at least one parking locations is available, a routing to the one of the at least one parking locations, receive, repeatedly, a GPS signal as a mobile computing device is moved to the one of the at least one parking locations, compare, repeatedly, the GPS signal to the one of the at least one parking locations, determine whether the mobile computing device is within a prescribed distance of the one of the at least one parking locations, display on the mobile computing device, when the mobile computing device is within the prescribed distance, entry information comprising at least one of text, photo, audio, and video information with instructions for use of the one of the at least one parking locations, display on the mobile computing device, when the mobile computing device is within the prescribed distance, a first confirmation prompt, receive a first confirmation input in response to the first confirmation prompt, receive a tilt/inertia and speed signal from a tilt/inertia sensor of the mobile computing device, and determine, in response to the tilt/inertia and speed signal and the GPS signal, whether the vehicle is parked at the one of the at least one parking locations.

A system for detecting parking of a vehicle is also described. The system may include a mobile computing device configured for network communication and may include a display, a GPS receiver, a sensor (e.g., a tilt/inertia sensor), and an application configured to run on the mobile computing device. The mobile computing device may be configured to select one of at least one parking locations and check availability of the one of the at least one parking locations for whether the one of the at least one parking locations is available. The mobile computing device may be configured to display, when the one of the at least one parking locations is available, a routing to the one of the at least one parking locations. The mobile computing device may also be configured to display, repeatedly, a GPS signal as the mobile computing device is moved to the one of the at least one parking locations and compare, repeatedly, the GPS signal to the one of the at least one parking locations. The mobile computing device may further be configured to determine whether the mobile computing device is within a prescribed distance of the one of the at least one parking locations and display on the mobile computing device, when the mobile computing device is within the prescribed distance, entry information comprising at least one of text, photo, audio, and video information with instructions for use of the one of the at least one parking locations. The mobile computing device may be configured to display on the mobile computing device, when the mobile computing device is within the prescribed distance, a first confirmation prompt, receive a first confirmation input in response to the first confirmation prompt, receive a tilt/inertia and speed signal from the tilt/inertia sensor of the mobile computing device, and determine, in response to said tilt/inertia and speed signal and said GPS signal, whether the vehicle is parked at the one of the at least one parking locations.

DETAILED DESCRIPTION

Figure 1:
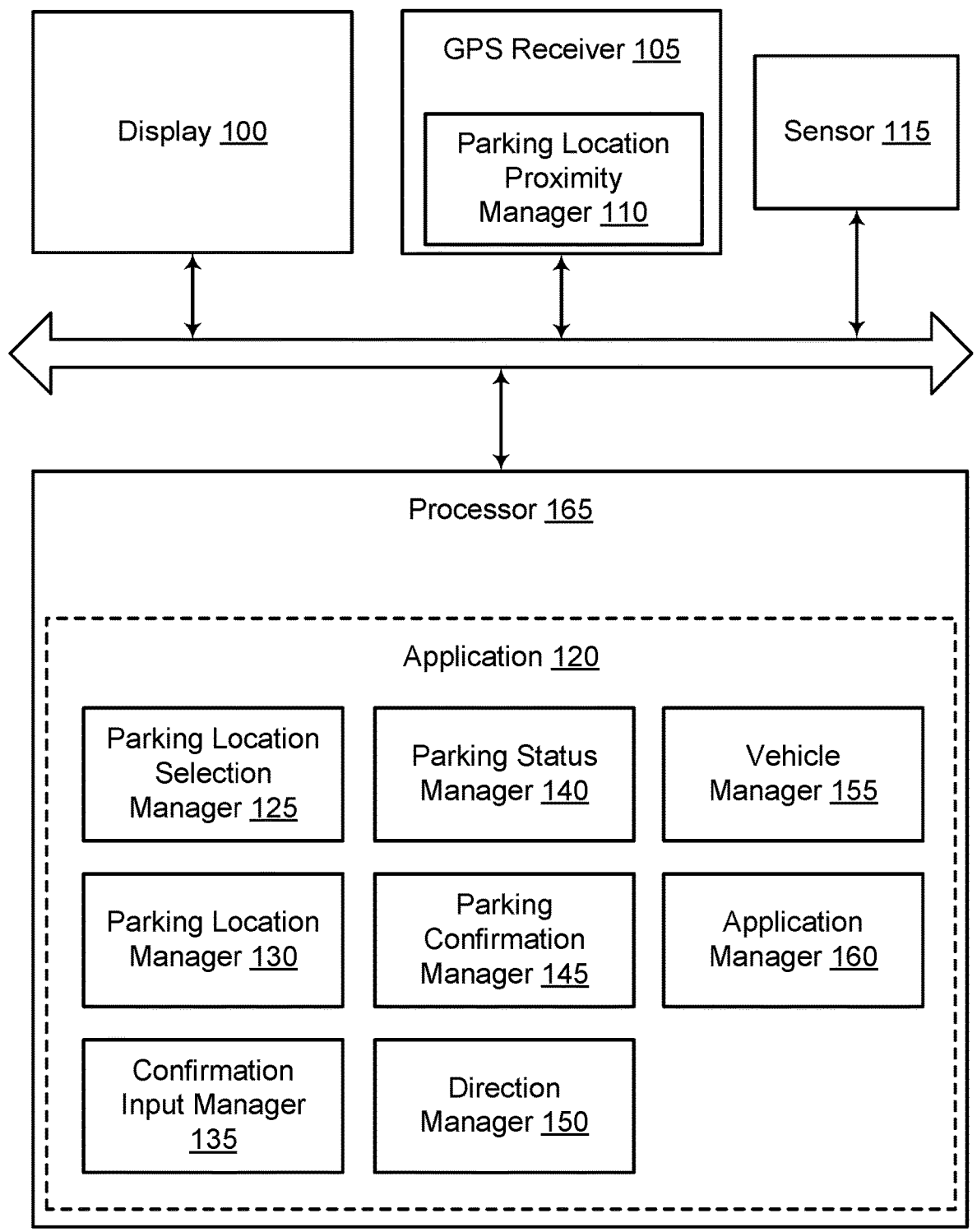
FIG. 1 shows an example of system diagram according to aspects of the present disclosure.

The following description is not to be taken in a limiting sense, but is made merely for the purpose of describing the general principles of exemplary embodiments. The scope of the invention should be determined with reference to the claims.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention can be practiced without one or more of the specific details, or with other methods, components, materials, and so forth. In other instances, well-known structures, materials, or operations are not shown or described in detail to avoid obscuring aspects of the invention.

As described, efficient systems for organizing availability of vehicle parking becomes increasingly important as population grows, vehicle usage increases, cites densify, etc. Cost considerations, space availability, and general efficiency of a parking system may be weighed in the adoption of a particular parking system. For instance, high parking demand may be costly to satisfy due to increasing real estate costs, densification of cities and resulting lack of available space (e.g., in downtown areas), etc.

Many parking systems are limited to a given parking area (e.g., a parking lot, a parking garage, etc.) that includes a number of vehicle stalls. However, such systems may have various limitations including the amount of space available (e.g., as the amount of space associated with a given parking area may be limited by available space in the region, the cost of real estate in the region, etc.). Moreover, the space available in parking areas may not be utilized efficiently. For instance, availability of individual parking stalls may be ineffectively tracked and vehicle stalls may be established as a certain dimension some vehicles may not be compatible with (e.g., as some vehicles may be too large to fit in established vehicle stalls, some vehicles may be compact and may underutilize established vehicle stalls, etc.).

The techniques described generally provide for improved parking systems. Specifically, the described techniques may provide for improved detection of parking status (e.g., of whether a vehicle is in a parking location or has left a parking location). For instance, a parking system may include a number of parking locations, where the availability of each parking location may be tracked based on detection of whether or not a vehicle is in the parking location. Additionally, aspects of the described techniques may provide for private and public (e.g., private individual user and public institution user) listing of space available for usage as a parking location. Accordingly, a parking system may organize various parking locations (e.g., including parking locations of various sizes, with various amenities, in various geographic areas, etc.) based on availability and unavailability that may be determined accurately according to the parking status detection techniques described herein.

Various embodiments of the present disclosure may include usage of device sensors (e.g., a tilt/inertia sensor, global positioning service (GPS) sensors, etc.) to determine whether a device (e.g., a mobile computing device) has left the vehicle in the parking location (e.g., and thus the parking location is unavailable as the user with the device is leaving the vehicle in the parking location) or whether the device has left the parking location in the vehicle (e.g., and thus the parking location is now available as the user and the device are leaving the parking location in the vehicle).

Various embodiments of the present disclosure may include organizing available and unavailable parking locations, including user listing of parking locations (e.g., users listing space available to be used as a parking location), tracking of available and unavailable parking locations (e.g., based on parking location listings and detected parking status for the listed parking locations), as well as tracking of different characteristics of different parking locations (e.g., such as geographic location, size, cost, availability, etc.).

FIG. 1 shows an example of system diagram according to aspects of the present disclosure. The example shown includes display 100, GPS receiver 105, sensor 115, and processor 165. In some cases, a device (e.g., a mobile computing device) may include display 100, GPS receiver 105, sensor 115, and processor 165. Display 100, GPS receiver 105, sensor 115, and processor 165 may be connected via one or more buses, and may be operable to perform various functions and operations described herein. In some examples, processor 165 may generally refer to any hardware capable of running application 120. Application 120 may generally be run via any combination of hardware components (e.g., such as processor 165, memory, etc.), software, and other logic.

A processor (e.g., processor 165) is an intelligent hardware device, (e.g., a general-purpose processing component, a digital signal processor (DSP), a central processing unit (CPU), a graphics processing unit (GPU), a microcontroller, an application specific integrated circuit (ASIC), a field programmable gate array (FPGA), a programmable logic device, a discrete gate or transistor logic component, a discrete hardware component, or any combination thereof). In some cases, the processor is configured to operate a memory array using a memory controller. In other cases, a memory controller is integrated into the processor. In some cases, the processor is configured to execute computer-readable instructions stored in a memory to perform various functions. In some embodiments, a processor includes special purpose components for modem processing, baseband processing, digital signal processing, or transmission processing.

A database is an organized collection of data. For example, a database stores data in a specified format known as a schema. A database may be structured as a single database, a distributed database, multiple distributed databases, or an emergency backup database. In some cases, a database controller may manage data storage and processing in a database. In some cases, a user interacts with database controller. In other cases, database controller may operate automatically without user interaction. A system may implement a database for various operations described herein. For instance, a database may be managed to store information of system users, parking locations, parking location characteristics, historical data, geographical and directional data, and application 120 data (e.g., parking status detection information, user prompt information, etc.), among other examples.

Software may include code to implement aspects of the present disclosure. Software may be stored in a non-transitory computer-readable medium such as system memory or other memory. In some cases, the software may not be directly executable by the processor but may cause a computer (e.g., when compiled and executed) to perform functions described herein.

A display 100 may comprise a conventional monitor, a monitor coupled with an integrated display 100, an integrated display 100 (e.g., an LCD display 100), or other means for viewing associated data or processing information. Output devices other than the display 100 can be used, such as printers, other computers or data storage devices, and computer networks.

An IO controller may manage input and output signals for a device. IO controller may also manage peripherals not integrated into a device. In some cases, an IO controller may represent a physical connection or port to an external peripheral. In some cases, an IO controller may utilize an operating system such as iOS®, ANDROID®, MS-DOS®, MS-WINDOWS®, OS/2®, UNIX®, LINUX®, or another known operating system. In other cases, an IO controller may represent or interact with a modem, a keyboard, a mouse, a touchscreen, or a similar device. In some cases, an IO controller may be implemented as part of processor 165. In some cases, a user may interact with a device via IO controller or via hardware components controlled by an IO controller.

An artificial neural network (ANN) is a hardware or a software component that includes a number of connected nodes (i.e., artificial neurons), which loosely correspond to the neurons in a human brain. Each connection, or edge, transmits a signal from one node to another (like the physical synapses in a brain). When a node receives a signal, it processes the signal and then transmits the processed signal to other connected nodes. In some cases, the signals between nodes comprise real numbers, and the output of each node is computed by a function of the sum of its inputs. Each node and edge is associated with one or more node weights that determine how the signal is processed and transmitted. During the training process, these weights are adjusted to improve the accuracy of the result (i.e., by minimizing a loss function which corresponds in some way to the difference between the current result and the target result). The weight of an edge increases or decreases the strength of the signal transmitted between nodes. In some cases, nodes have a threshold below which a signal is not transmitted at all. In some examples, the nodes are aggregated into layers. Different layers perform different transformations on their inputs. The initial layer is known as the input layer and the last layer is known as the output layer. In some cases, signals traverse certain layers multiple times.

In one embodiment, GPS receiver 105 includes parking location proximity manager 110.

According to some embodiments, parking location proximity manager 110 receives, repeatedly, a GPS signal as a mobile computing device is moved to the one of the at least one parking locations. In some examples, parking location proximity manager 110 compares, repeatedly, the GPS signal to the one of the at least one parking locations. In some examples, parking location proximity manager 110 determines whether the mobile computing device is within a prescribed distance of the one of the at least one parking locations. In some examples, parking location proximity manager 110 displays the filtered set on a map (e.g., via display 100). In some examples, parking location proximity manager 110 displays a location of the mobile computing device on the map with the filtered set (e.g., via display 100). In some examples, parking location proximity manager 110 receives the GPS signal. In some examples, parking location proximity manager 110 determines a location of the mobile computing device as a function of the GPS signal. In some examples, parking location proximity manager 110 transmits the location of the mobile computing device to a server and requesting the at least one parking locations within the prescribed distance of the location of the mobile computing device.

According to some embodiments, sensor 115 (e.g., a tilt/inertia sensor 115) may monitor various inputs such as acceleration (e.g., translational and/or rotational), speed, etc. For instance, a system (e.g., mobile computing device) may include a sensor 115 and may receive a tilt/inertia and speed signal from the tilt/inertia sensor 115. In some cases, sensor 115 may include an inertial measurement unit (IMU), an accelerometer, a gyroscope, etc.

In one embodiment, application 120 includes parking location selection manager 125, parking location manager 130, confirmation input manager 135, parking status manager 140, parking confirmation manager 145, direction manager 150, vehicle manager 155, and application manager 160.

According to some embodiments, parking location selection manager 125 selects one of at least one parking locations. In some examples, parking location selection manager 125 receives a filtering criteria, including a vehicle size. In some examples, parking location selection manager 125 filters the data set received using the filtering criteria to define a filtered set. In some examples, parking location selection manager 125 receives a selection of one of the at least one parking locations displayed on the map.

According to some embodiments, parking location manager 130 checks availability of the one of the at least one parking locations for whether the one of the at least one parking locations is available. In some examples, parking location manager 130 displays on the mobile computing device (e.g., via display 100), when the mobile computing device is within the prescribed distance, entry information including at least one of text, photo, audio, and video information with instructions for use of the one of the at least one parking locations. In some examples, parking location manager 130 receives a data set for each of the at least one parking locations where the data set includes at least a location for each of the at least one parking locations, maximum vehicle size information for each of the at least one parking locations, a list of amenities for each of the at least one parking locations, at least one customer review for each of the at least one parking locations, pricing information for each of the at least one parking locations, and availability for each of the at least one parking locations. In some examples, parking location manager 130 displays a textual description, photograph, pricing, and user reviews for the one of the at least one parking locations having been selected (e.g., via display 100).

In some examples, parking location manager 130 compares the vehicle size to the maximum vehicle size to determine if the vehicle will fit within the one of the at least one parking locations. In some examples, parking location manager 130 receives, when the selection for the future booking is received, an input for the future booking including the future date and time selection. In some examples, parking location manager 130 receives an input for the duration time at the one of the at least one parking locations selected. In some examples, the checking the availability of the one of the at least one parking locations includes checking whether the one of the at least one parking locations is available for the duration time, and, when the selection for the future booking is received, the input for the future date and time selection.

According to some embodiments, confirmation input manager 135 receives a first confirmation input in response to the first confirmation prompt.

According to some embodiments, parking status manager 140 determines, in response to the tilt/inertia and speed signal and the GPS signal, whether the vehicle is parked at the one of the at least one parking locations. In some examples, parking status manager 140 determines, in response to the tilt/inertia and speed signal and the GPS signal, whether the mobile computing device is no longer in the vehicle. In some examples, parking status manager 140 determines that the mobile computing device has returned to the vehicle after a period of time. In some examples, parking status manager 140 displays on the mobile computing device a second confirmation prompt (e.g., via display 100). In some examples, parking status manager 140 receives a second confirmation response in response to the second confirmation prompt. In some examples, parking status manager 140 transmits the period of time having been determined to a server.

According to some embodiments, parking confirmation manager 145 displays on the mobile computing device (e.g., via display 100), when the mobile computing device is within the prescribed distance, a first confirmation prompt.

According to some embodiments, direction manager 150 displays, when the one of the at least one parking locations is available, a routing to the one of the at least one parking locations (e.g., via display 100).

According to some embodiments, vehicle manager 155 receives the vehicle size. In some examples, vehicle manager 155 stores the vehicle size in a memory in the mobile computing device. In some examples, vehicle manager 155 retrieves the vehicle size from the memory.

According to some embodiments, application manager 160 launches an application 120 on the mobile computing device. In some examples, application manager 160 displays an input option for an immediate booking or a future booking (e.g., via display 100). In some examples, application manager 160 receives a selection of the immediate booking or the future booking. In some examples, application manager 160 displays, when the selection for the future booking is received, an input options for the future booking including a future date and time selection (e.g., via display 100). In some examples, application manager 160 displays an input option for a duration time at the one of the at least one parking locations selected (e.g., via display 100).

According to some aspects of the present disclosure, application 120 (e.g., parking status manager 140) may generate a pop up (e.g., a pop up 605, as further described with reference to FIG. 6) when a mobile device gets close to its destination (e.g., when a mobile device gets close to a selected parking location). The generated pop up may provide additional details on how to check into a parking location in the instance of the application 120. For example, the pop up may provide a manual option to confirm the user has arrived in the selected parking location.

In some cases, the example system of FIG. 1 may illustrate aspects of a parking system, a mobile computing device, etc. The system may generally be a mobile, driving, parking vehicle location detection system. As used herein, a vehicle may include an automobile, a car, a truck, a bus, a motorcycle, a recreational vehicle (RV), etc. A vehicle may also include various attachments (e.g., such as trailers, boats, oversized loads, plows or other front end attachments, etc.) which may collectively be referred to as the vehicle (e.g., in some cases, a truck towing a boat may be referred to collectively as a vehicle).

Without the techniques described herein, using a device (e.g., a mobile device) for a parking application may not facilitate effective determination of whether a vehicle has reached its location or left its location (e.g., without human intervention). For instance, a device may likely leave the vehicle with the vehicle operator upon parking the vehicle (e.g., a driver of the vehicle may exit the vehicle with the device in the driver's pocket), which may trigger a false assumption that the vehicle has left its parking location (e.g., when the vehicle is actually still in the parking location but the vehicle operator and device have exited the parked vehicle). As used herein, a device may generally refer to any device (e.g., such as a mobile computing device, a personal digital assistant (PDA), a personal laptop, a wireless device, an internet of things (IoT) device, or any other suitable device.)

The techniques described herein may be employed to determine the state of a device to determine if the device has left the vehicle and mark the spot when the device left the vehicle. The techniques may also effectively (e.g., intelligently, accurately, etc.) determine when the device has returned to the same parked vehicle and has started to move as the vehicle drives away and exits the parking location. In some examples, the described techniques may accurately identify whether the device is indeed exiting the parking location in the original vehicle parked in the parking location or in another second vehicle (e.g., such that the original vehicle is still in the parking location). For example, if another second vehicle pulled up next to the original vehicle and the user and device moved to the second vehicle and left the parking area, the system may intelligently determine that the device is not in the same vehicle and that the original vehicle is still in the parking location (e.g., and thus the parking location is still unavailable after the device leaves the parking area in another second vehicle).

The technique described herein may provide for an automated way to determine if the user (e.g., vehicle operator/user, device app operator/user, system operator/user, etc.) has parked their vehicle (e.g., occupied a parking location) or unparked their vehicle (e.g., exited a parking location) to product a number of automated tasks based on this knowledge (e.g., based on detection of parking status associated with the parking location). It should be noted that the techniques described herein may be described in the context of parking status detection (e.g., for parking check-in and parking check-out logic), however the techniques described may be applicable to other applications by analogy, without departing from the scope of the present disclosure. For example, the techniques described herein may be applied to automatic gate operation, door lock operation, security systems, surveillance systems, bank accounts, automatic teller machines (ATMs), lighting systems, etc.

As discussed herein, detection of parking status may be performed using any combination of various system elements including, but not limited to, WiFi, GPS (e.g., including GPS receiver 105), Bluetooth, microphones, display 100, step counters, sensors 115 (e.g., tilt sensors, altimeter, inertia sensor, speed sensor, Accelerometer, Barometer, Ultrasonic Fingerprint Sensor, Gyro Sensor, Geomagnetic Sensor, Hall Sensor, Heart Rate Sensor, Proximity Sensor, red-green-blue (RGB) Light Sensor, temperature sensor, humidity sensor, plug sensor, charging sensor, etc.), processor 165, application programing interfaces (APIs), application 120, etc. Detection of parking status may further be performed via implementation of artificial intelligence (e.g., such as an ANN).

Figure 2:
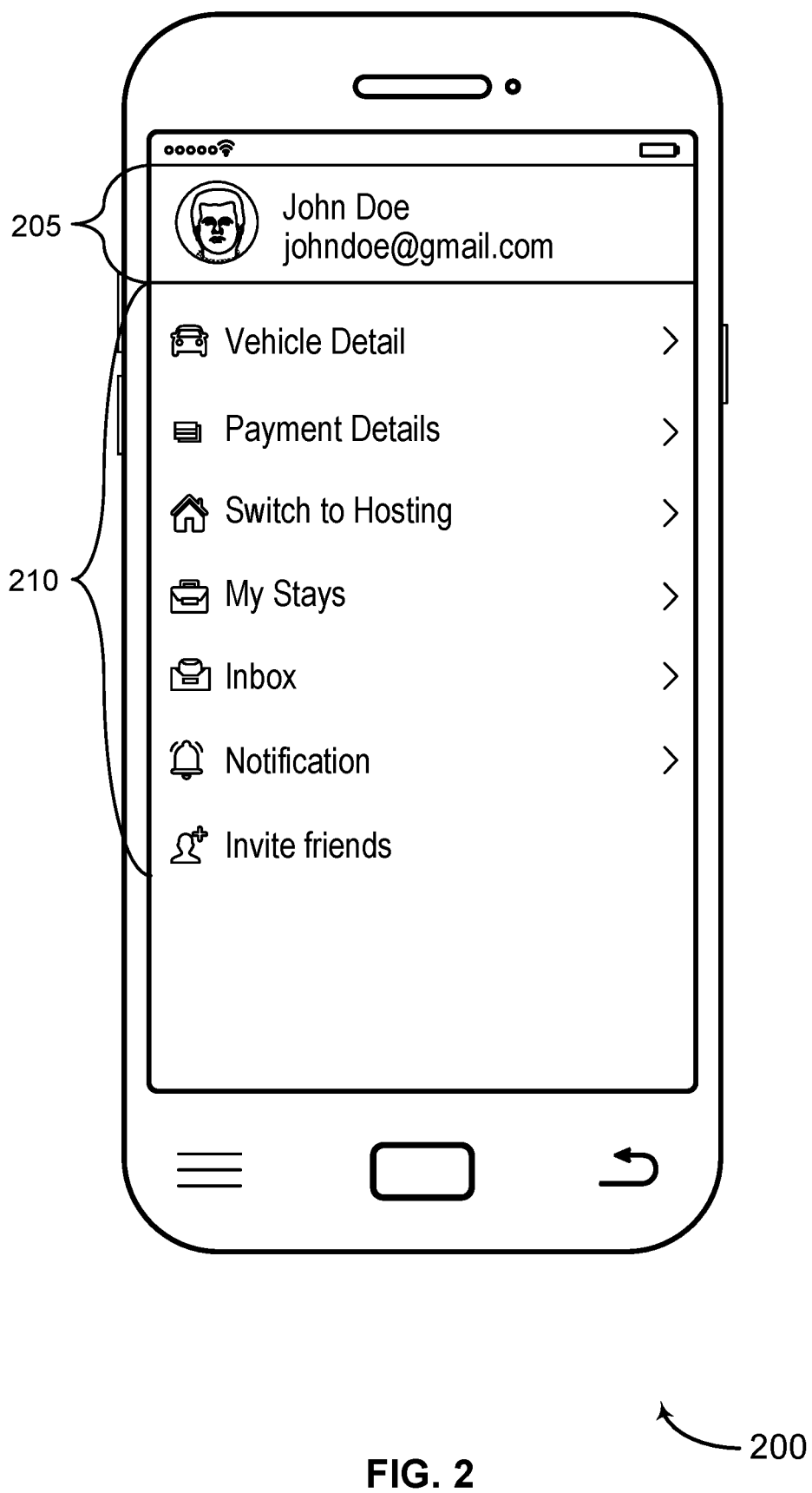
FIG. 2 shows an example of application home page diagram according to aspects of the present disclosure.

FIG. 2 shows an example of application home page diagram according to aspects of the present disclosure. The example application home page diagram may illustrate an example of a home page display output 200 in accordance with one or more aspects of the present disclosure. Home page display output 200 may illustrate user account information 205 and application options 210 that may be displayed (e.g., by a device).

For instance, account information 205 may display information associated with the user account logged into the system (e.g., the user account logged into the application on the device). Account information 205 may include, for example, an image of the user, a name of the user, an email of the user, etc.

Application options 210 may generally provide various options for navigating and employing the application. For instance, a user may select any of application options 210 to perform operations associated with the selected application operation 210. Application options 210 may include, but are not limited to, vehicle detail (e.g., to view and manage vehicle information, such as license plate number, color, size or other dimensions, accessories such as any trailers towed by the vehicle, etc.), payment details (e.g., to view and manage credit card information or other forms of payment), switch to hosting (e.g., to switch back and forth between a parking mode and a hosting mode), my stays (e.g., to view and manage previous parking receipts and/or previous parking hosting receipts), inbox (e.g., to view and manage any direct messages within the application), notification, invite friends, etc.

In some cases, a user may input vehicle information and the system may store the input vehicle. For instance, a user may input a vehicle license plate number, a vehicle color, a vehicle size or vehicle dimensions, vehicle accessories such as any trailers towed by the vehicle, etc. Accordingly, the system may store such information and cater or filter available destination options (e.g., available parking locations) as described in more detail herein. For instance, if a user inputs a vehicle with some general length×width×height dimensions, the system may compare such dimensions to dimensions of available parking locations.

Figure 3:
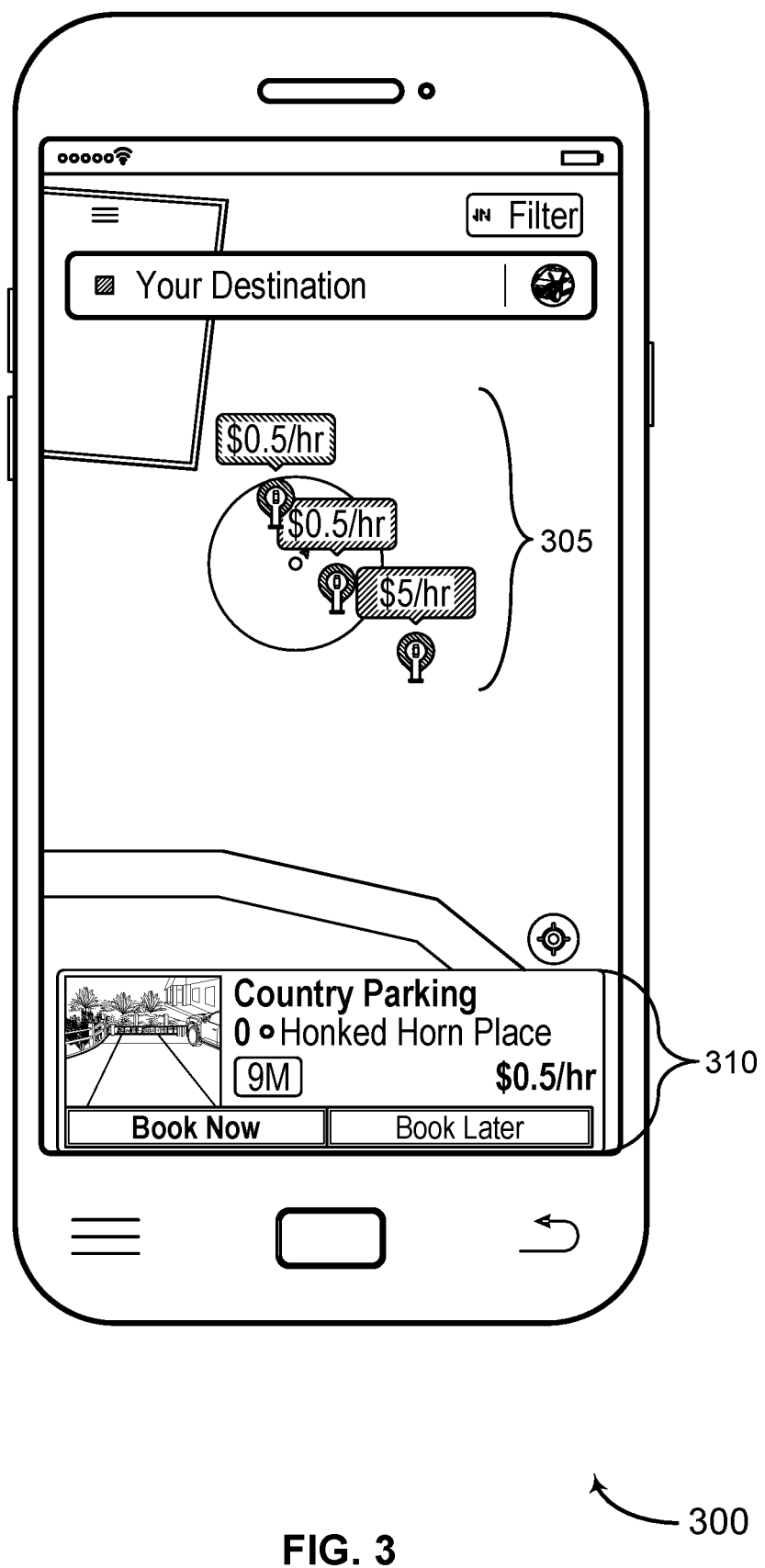
FIGS. 3 through 8 show example application diagrams according to aspects of the present disclosure.

FIG. 3 shows an example of application diagram according to aspects of the present disclosure. The example application diagram may illustrate an example of a parking locations display output 300 in accordance with one or more aspects of the present disclosure. Parking locations display output 300 may illustrate destination options 305 and selected destination 310 that may be displayed (e.g., by a device).

For example, a user may input some destination (e.g., in a "Your Destination" field) and a number of destination options 305 may be displayed on a map (e.g., where the map may be defined by some proximity of the input destination). A user may then select various destinations (e.g., parking locations) from the displayed destination options 305 to further inspect (e.g., gather additional displayed information) on the selected destination 310. For instance the selected destination 310 may include information such as a name of the selected destination, an image of the selected destination, a full or partial address of the selected destination, a distance from the selected destination, a price (e.g., a price per hour) of the selected destination, etc.). In some examples, the selected destination 310 may also include booking options (e.g., the selected destination 310 may include a "Book Now" option and a "Book Later" option).

In some examples, parking locations display output 300 may further include filtering options a user may use to filter certain parking location options 305. For instance, a user may filter parking location options 305 based on dimensions of the user's vehicle, based on desired amenities associated with parking locations, based on availability of parking locations, based on price of parking locations, etc. In some examples, the parking location options 305 may be automatically filtered (e.g., by the system, by the application, by the device, etc.) based on a user's vehicle that is entered into the system (e.g., the system may automatically filter out parking locations that the user's vehicle is incompatible with, such as smaller parking spaces in cases where the user's vehicle is an RV or is towing a trailer).

Figure 4:
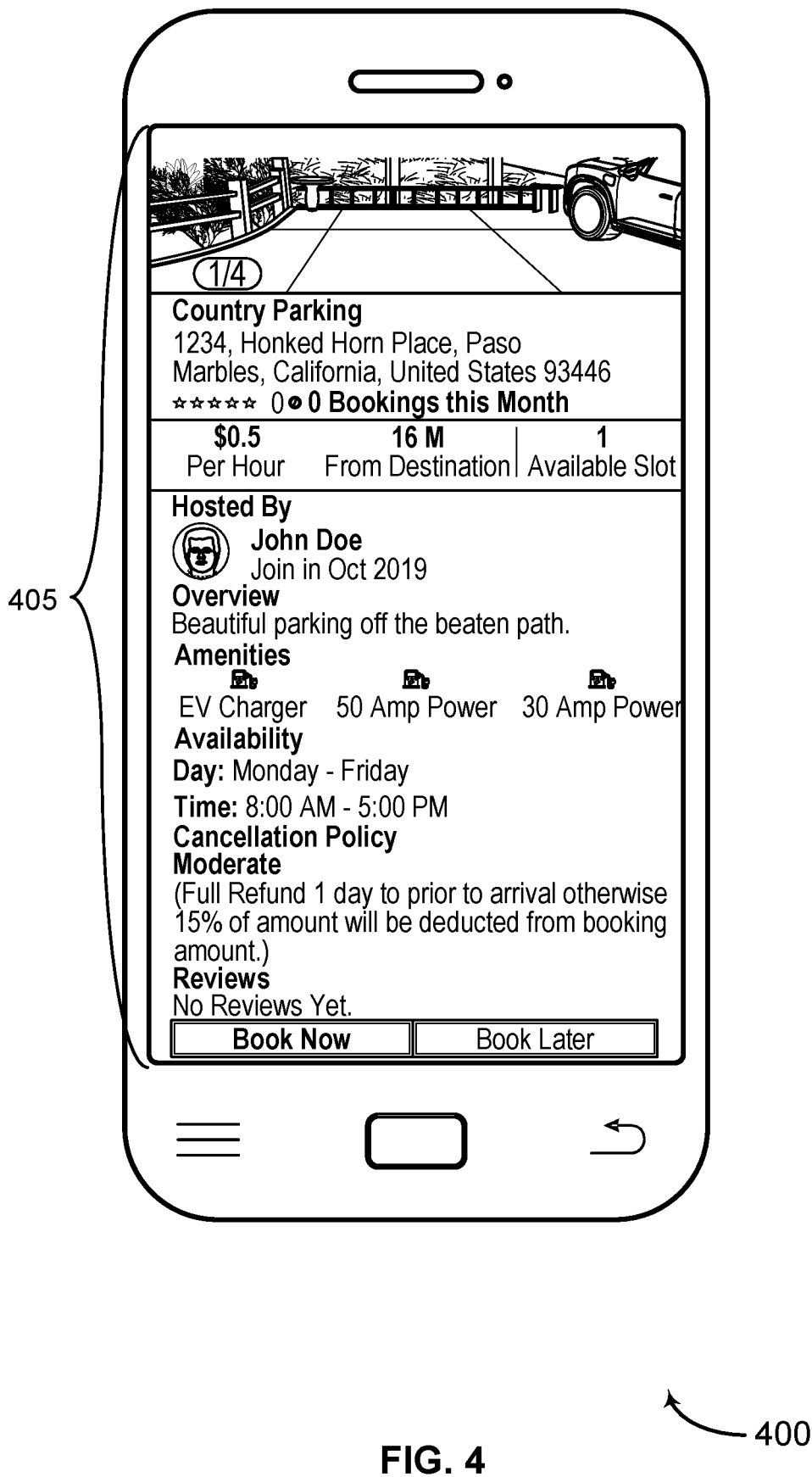

FIG. 4 shows an example of application diagram according to aspects of the present disclosure. The example application diagram may illustrate an example of a parking location display output 400 in accordance with one or more aspects of the present disclosure. Parking location display output 400 may illustrate detailed destination information 405 that may be displayed (e.g., by a device).

For example, if a user further selects (e.g., double taps, selects a view more detail option, etc.) a selected destination (e.g., via a displayed selected destination 310), detailed destination information 405 may be displayed. Detailed destination information 405 may generally illustrate any additional information for a selected destination. For example detailed destination information 405 may include additional images of a selected destination, a number of available parking locations (e.g., Available Slots") at a selected destination, information on a host of a selected destination, an overview of a selected destination, information on amenities included with a selected destination, information on availability of a selected destination, any policy information associated with a selected destination, reviews from previous users of a selected destination, etc. In some examples, detailed destination information 405 may also include booking options (e.g., a "Book Now" option and a "Book Later" option).

Figure 5:
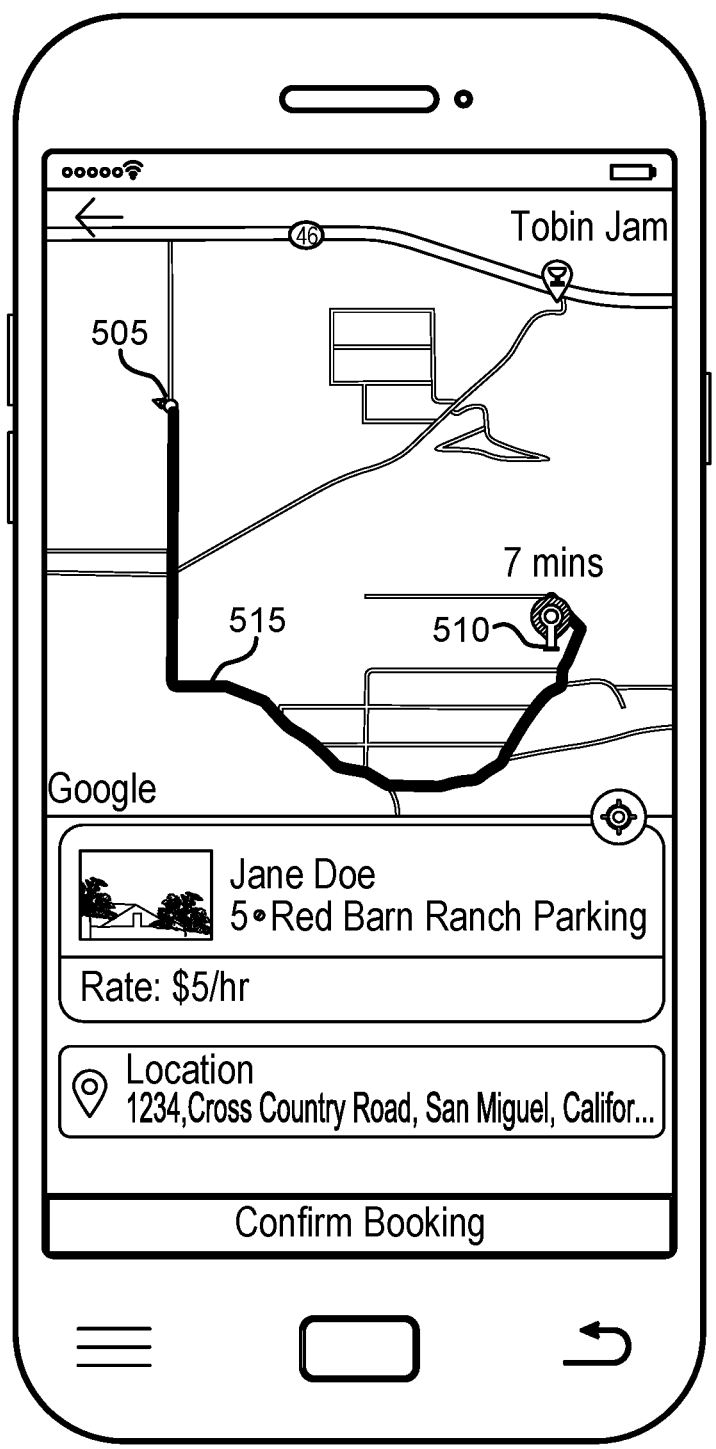

FIG. 5 shows an example of application diagram according to aspects of the present disclosure. The example application diagram may illustrate an example of a parking direction display output 500 in accordance with one or more aspects of the present disclosure. Parking direction display output 500 may illustrate current location 505, destination location 510, and a directional path 515 that may be displayed (e.g., by a device). In the example of FIG. 5, parking direction display output 500 may also include an estimated travel time duration to the selected destination, information on the selected destination (e.g., rate and location information on the selected destination), a confirm booking option, etc.

Figure 6:
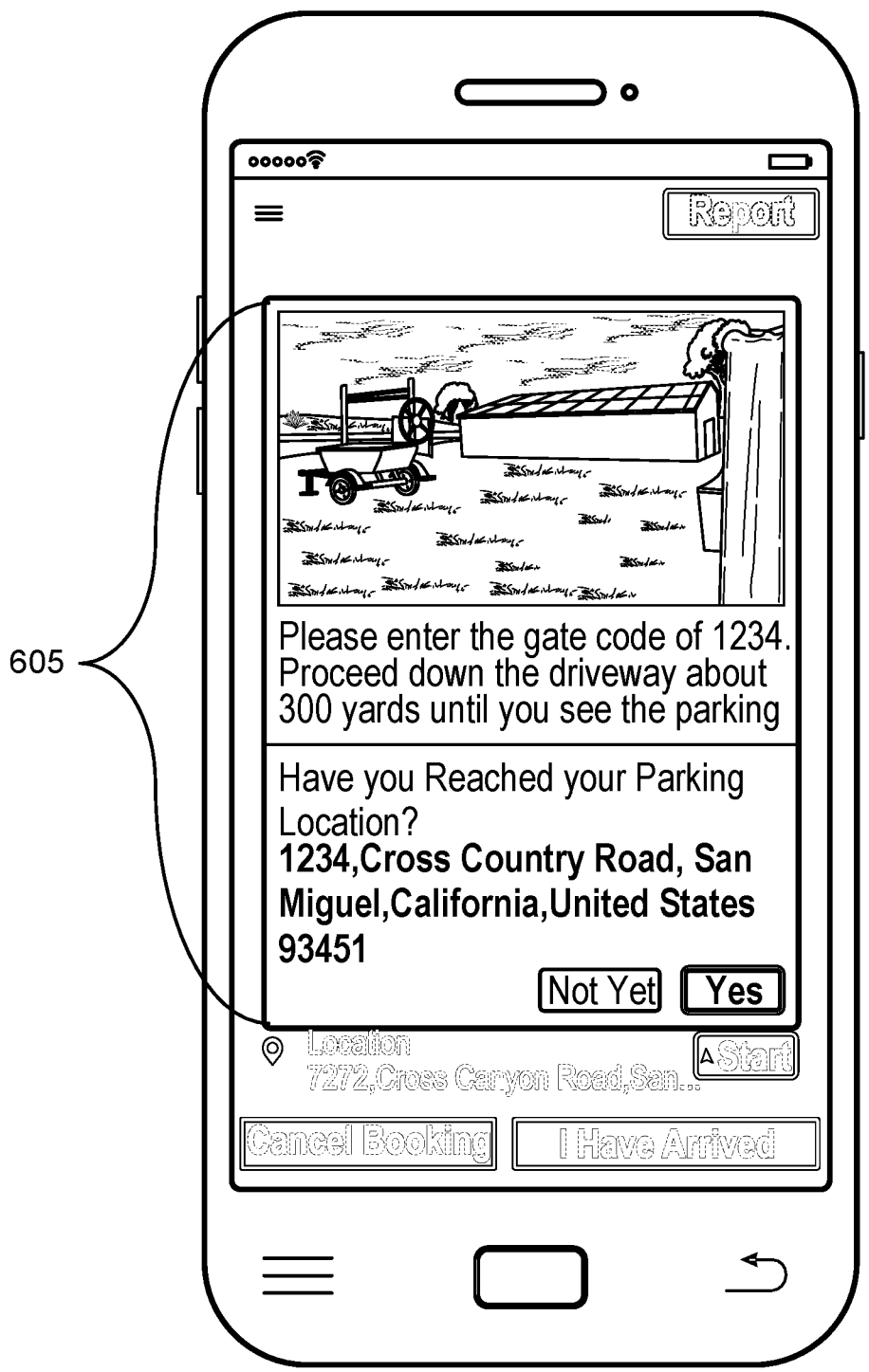

FIG. 6 shows an example of application diagram according to aspects of the present disclosure. The example application diagram may illustrate an example of a parking instruction display output 600 in accordance with one or more aspects of the present disclosure. Display output 600 may illustrate pop up 605 that may be displayed (e.g., by a device).

A system (e.g., a parking system, a device running a parking application, etc.) may display pop up 605 when a device approaches a destination (e.g., a parking location) within some threshold proximity. According to some examples, pop up 605 may provide additional details on how to check into a parking location (e.g., in the instance of the parking application). For instance, in example parking instruction display output 600, pop up 605 may display instructions for how to enter and access a parking location (e.g., "Please enter the gate code of 1234. Proceed down the driveway about 300 yards until you see that parking"). Pop up 605 may further provide a manual option to confirm the device (e.g., the user) has arrived in the parking location (e.g., pop up 605 may include a "Have you reached you Parking Location?" prompt as well as a selectable "Not Yet" option and a "yes" option).

To trigger the initial pop up (e.g., pop up 605), the techniques described herein may implement geo distancing techniques and, in some cases, may consider the current state of the device.

For example, a device may be heading toward a chosen destination (e.g., a selected parking location). The device may detect when a proximity threshold to the destination has been satisfied (e.g., the device may determine it is close enough to the destination) and the device may provide (e.g., display) a pop up 605 with the additional details to access the final destination. For instance, the details provided by pop up 605 may generally include details to gain access to a parking location, a short-term housing rental, a storage unit, a bank, etc. The details presented in pop up 605 may include an image of the destination, a password (e.g., a gate or lock password), a lock code, an exact address, a parking space number, a description of check-in procedures, etc.

In some examples, pop up 605 may include two buttons. A first button may confirm that the device is in the location (e.g., a "Yes" button) and a second button may reject the location pop up 605 (e.g., a "Not Yet" button).

In cases where the confirmation button is selected (e.g., where the user inputs "Yes"), an active state may be created for a check-in procedure. The active state may represent or initiate a billing period (e.g., initiate an hourly timer to calculate a billing total based on hourly rates). Generally, the billing period may correspond to a parking billing period, an electric vehicle (EV) charging billing period, a camping billing period, etc. In some cases, the active state may keep a lock state active (e.g., such that a lock code displayed in a pop up 605 may only work during the active state).

In cases where the rejection button is selected (e.g., where the user inputs "Not Yet"), the pop up 605 may go away. In some cases, the system may move the target "Geo Distance" associated with the destination to be closer to the ultimate destination (e.g., once the user ultimately confirms the user is in the destination the previous "Geo Distance" associated with the destination may be updated accordingly). In some cases, the system may move the target "Geo Distance" to be closer to the location and queue up the updated location for a second pop up (e.g., a second pop up 605 associated with an updated "Geo Distance"). Additionally, when the rejection button is selected, the system may respond to an artificial intelligence system (e.g., artificial intelligence component, an artificial intelligence network, an ANN, etc.) that the pop up 605 was inaccurate in order to help train the artificial intelligence system on a more accurate means of when to generate and display pop ups for the same and/or other destinations.

In some examples, the confirmation/rejection selection may be used to train the artificial intelligence system to provide pop ups more accurately until the system can determine arrival (e.g., and thus accurate timing for displaying pop ups) with increased accuracy (e.g., almost 100% accuracy). When the device receives selection of a confirmation button (e.g., or when the device does not receive selection of a rejection button) the artificial intelligence system may look to a user's next "GEO Distance" and/or the state of the device activity changes such that the artificial intelligence system may determine the user is in fact at the destination (e.g., in order to create and/or initiate the active state).

Figure 7:
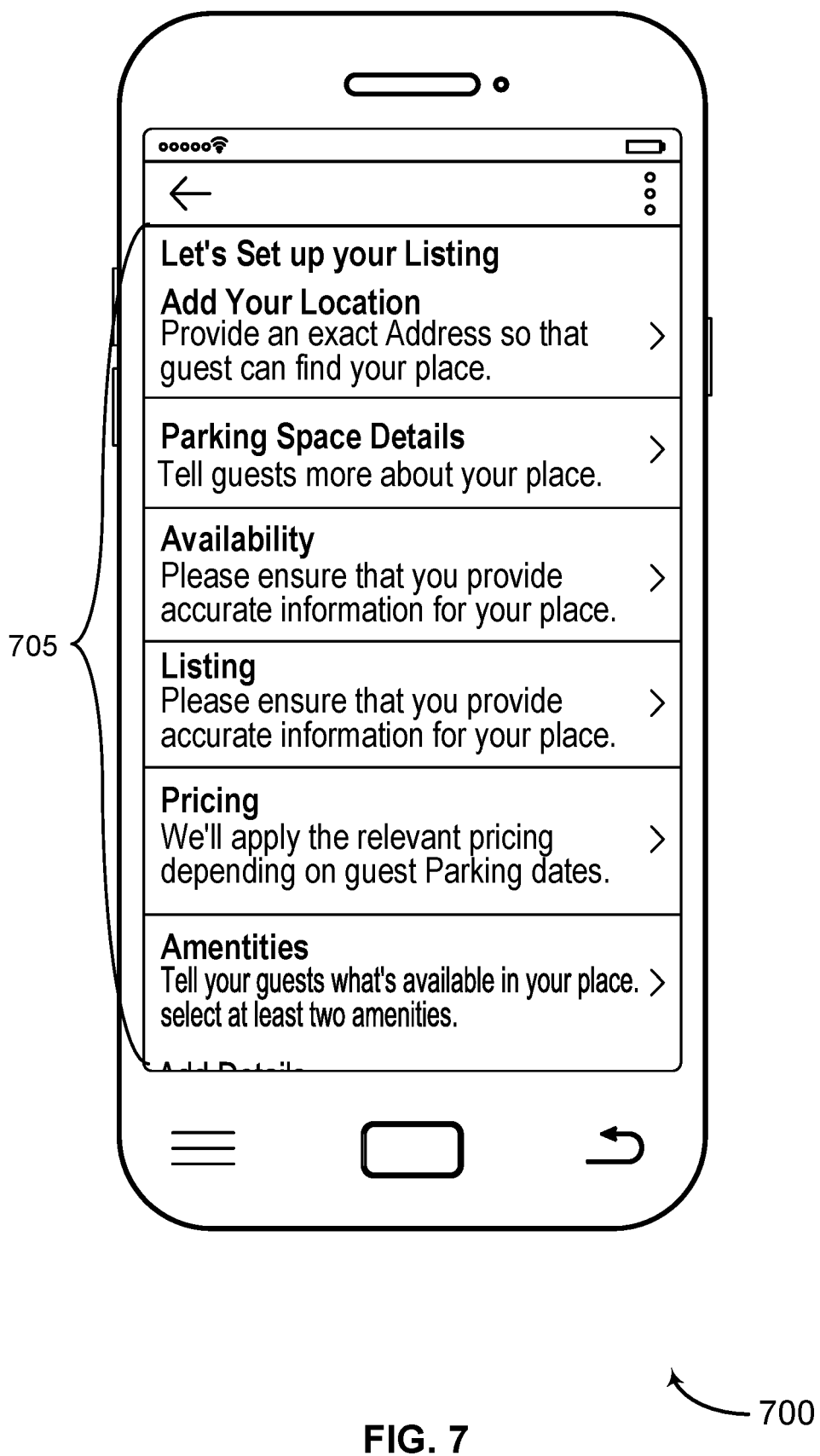

FIG. 7 shows an example of application diagram according to aspects of the present disclosure. The example application diagram may illustrate an example of a listing set-up display output 700 in accordance with one or more aspects of the present disclosure. Listing set-up display output 700 may illustrate listing set-up options 705 that may be displayed (e.g., by a device).

Listing set-up options 705 may generally include various options for setting up a destination listing. For example, in a host mode, a user (e.g., a host, a host user, etc.) may select an option to add a listing and example listing set-up options 705 may be displayed. Listing set-up options 705 may include an option to add a location, to provide destination details (e.g., such as images, parking space dimensions, number of parking spaces, etc.), to provide availability (e.g., certain days, certain hours of the day, etc.), to provide listing information, to provide pricing (e.g., such as a price in dollars per hour), to provide information on amenities, etc.

In some examples, an add location option may include a feature for a listing user to physically stand in the location of the destination (e.g., in the location of a parking location, in the location of a storage unit, etc.) and select an option to post the device's current location as the location of the destination. In such cases, more accurate location information may be set for the destination (e.g., compared to entering an address associated with the destination), which may provide for more accurate pop ups (e.g., for more accurate pop ups provided by a device as described in more detail herein, for example, with reference to FIG. 6). In some examples, when setting a location for a destination, a prompt may be displayed prompting the listing user to be physically standing with the device in the destination spot. For instance, a device may prompt a "Are you standing in the parking location?" prompt along with selectable options "Yes" or "No" or "Add Address Instead."

In some example, details input into one or more listing set-up options 705 may be used to generate device pop ups (e.g., such as pop up 605). For instance, exact addresses, gate codes, detailed parking location or destination access information, etc. may be prompted via listing set-up options 705, and information input by a host may be displayed via a pop up when a user that selects a destination associated with the listing is within an established "Geo distance" of the destination. Additionally, "Add Your Location" information, where a user may physically hold the device in a destination, may be used by the application to prompt pop ups in accordance with one or more aspects of the techniques described herein.

Figure 8:
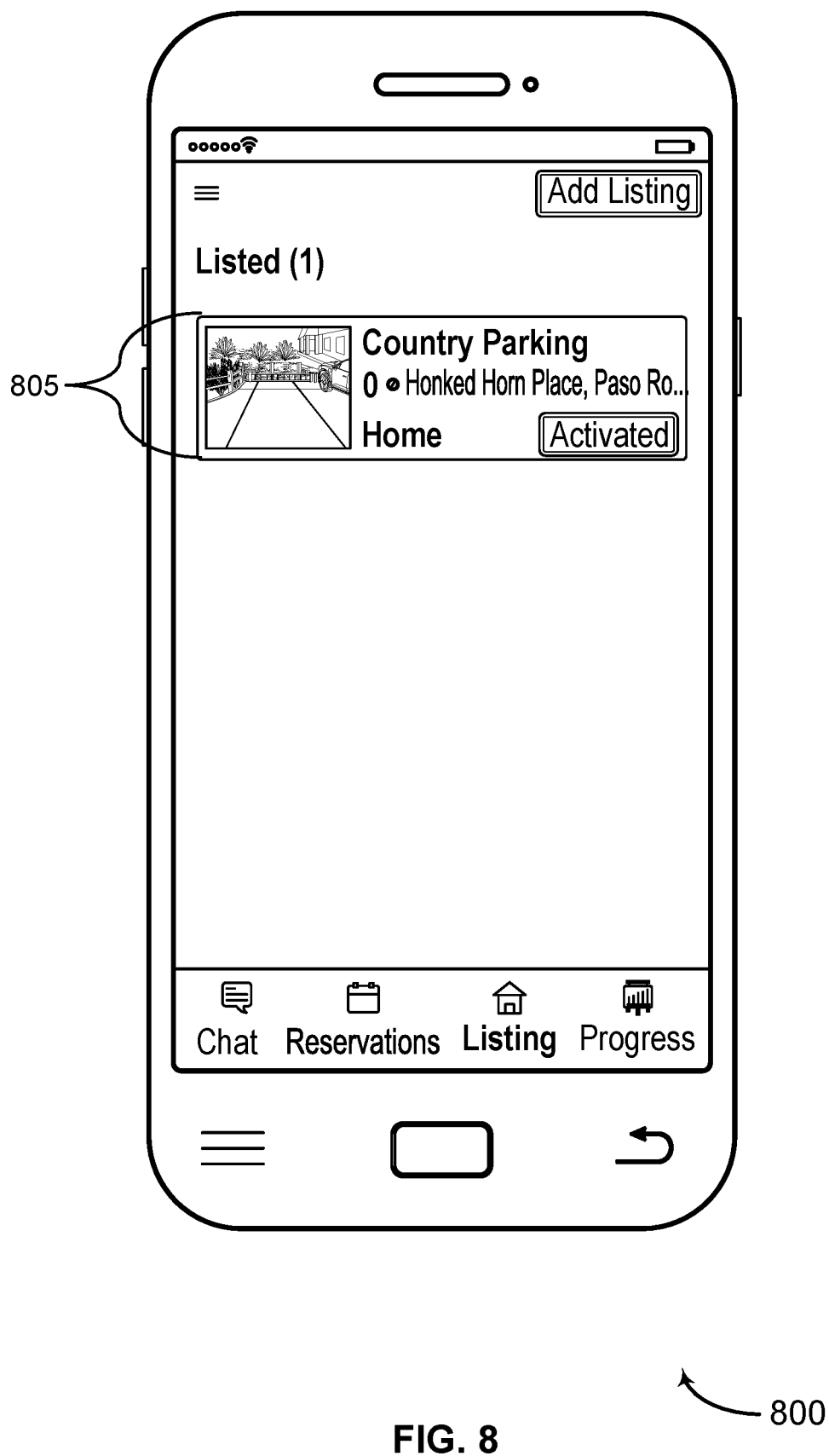

FIG. 8 shows an example of an application diagram according to aspects of the present disclosure. The example application diagram may illustrate an example of a listing management display output 800 in accordance with one or more aspects of the present disclosure. Listing management display output 800 may illustrate a user interface for listing management that may be displayed (e.g., by a device). For example, listing management display output 800 may illustrate an example interface for a host to manage (e.g., edit or delete) an existing listing 805, to add a new listing (e.g., via an "Add Listing" option), etc.

Figure 9:
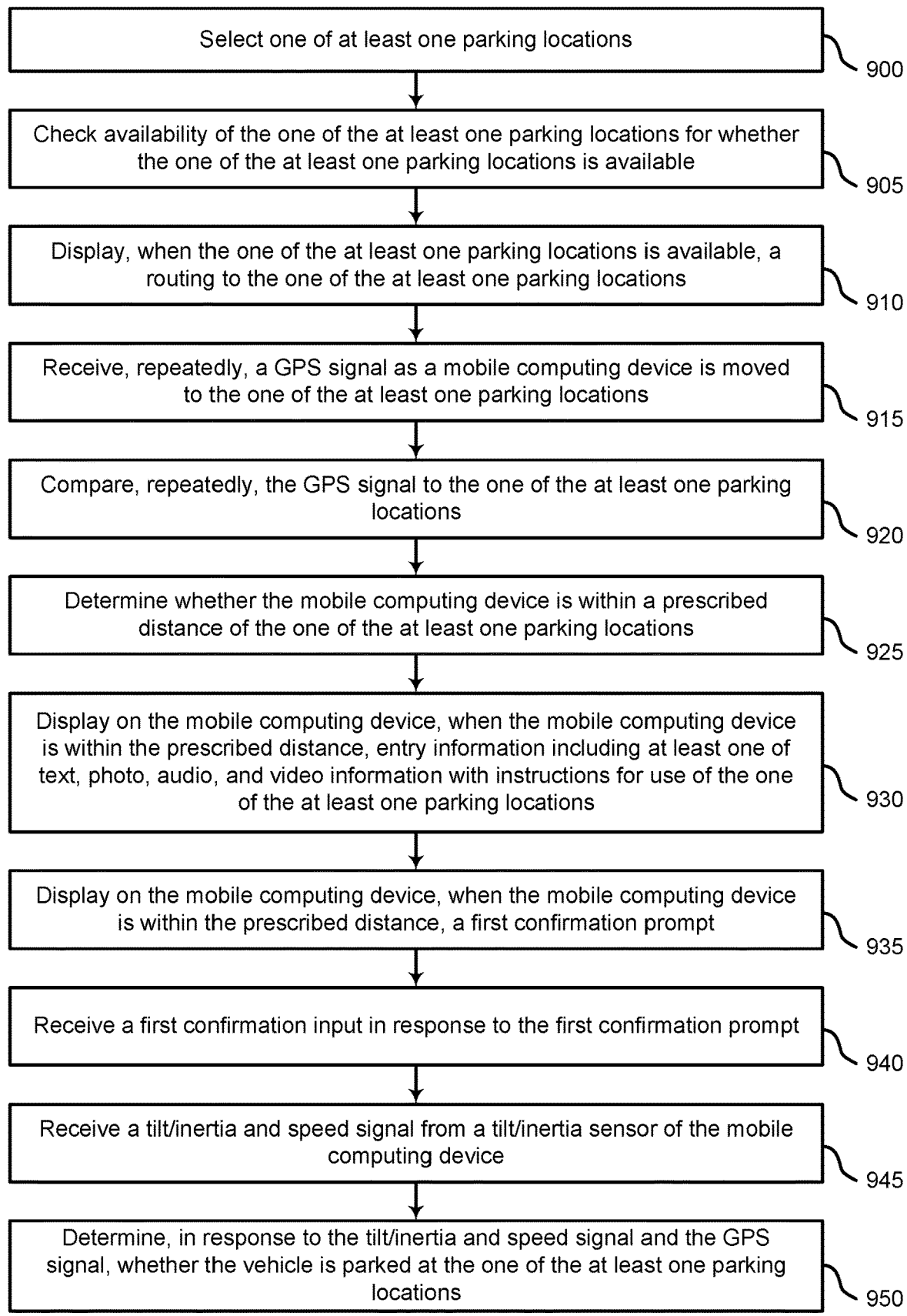
FIG. 9 shows an example of a process for detecting parking of a vehicle according to aspects of the present disclosure.

FIG. 9 shows an example of a process for detecting parking of a vehicle according to aspects of the present disclosure. In some examples, these operations are performed by a system including a processor executing a set of codes to control functional elements of an apparatus. Additionally, or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 900, the system selects one of at least one parking locations. In some cases, the operations of this step refer to, or may be performed by, a parking location selection manager as described with reference to FIG. 1.

At operation 905, the system checks availability of the one of the at least one parking locations for whether the one of the at least one parking locations is available. In some cases, the operations of this step refer to, or may be performed by, a parking location manager as described with reference to FIG. 1.

At operation 910, the system displays, when the one of the at least one parking locations is available, a routing to the one of the at least one parking locations. In some cases, the operations of this step refer to, or may be performed by, a direction manager as described with reference to FIG. 1.

At operation 915, the system receives, repeatedly, a GPS signal as a mobile computing device is moved to the one of the at least one parking locations. In some cases, the operations of this step refer to, or may be performed by, a parking location proximity manager as described with reference to FIG. 1.

At operation 920, the system compares, repeatedly, the GPS signal to the one of the at least one parking locations. In some cases, the operations of this step refer to, or may be performed by, a parking location proximity manager as described with reference to FIG. 1.

At operation 925, the system determines whether the mobile computing device is within a prescribed distance of the one of the at least one parking locations. In some cases, the operations of this step refer to, or may be performed by, a parking location proximity manager as described with reference to FIG. 1.

At operation 930, the system displays on the mobile computing device, when the mobile computing device is within the prescribed distance, entry information including at least one of text, photo, audio, and video information with instructions for use of the one of the at least one parking locations. In some cases, the operations of this step refer to, or may be performed by, a parking location manager as described with reference to FIG. 1.

At operation 935, the system displays on the mobile computing device, when the mobile computing device is within the prescribed distance, a first confirmation prompt. In some cases, the operations of this step refer to, or may be performed by, a parking confirmation manager as described with reference to FIG. 1.

At operation 940, the system receives a first confirmation input in response to the first confirmation prompt. In some cases, the operations of this step refer to, or may be performed by, a confirmation input manager as described with reference to FIG. 1.

At operation 945, the system receives a tilt/inertia and speed signal from a tilt/inertia sensor of the mobile computing device. In some cases, the operations of this step refer to, or may be performed by, a sensor as described with reference to FIG. 1.

At operation 950, the system determines, in response to the tilt/inertia and speed signal and the GPS signal, whether the vehicle is parked at the one of the at least one parking locations. In some cases, the operations of this step refer to, or may be performed by, a parking status manager as described with reference to FIG. 1.

Accordingly, the present disclosure includes the following embodiments.

A method for detecting parking of a vehicle is described. Embodiments of the method are configured to selecting one of at least one parking locations, checking availability of the one of the at least one parking locations for whether the one of the at least one parking locations is available, displaying, when the one of the at least one parking locations is available, a routing to the one of the at least one parking locations, receiving, repeatedly, a GPS signal as a mobile computing device is moved to the one of the at least one parking locations, comparing, repeatedly, the GPS signal to the one of the at least one parking locations, determining whether the mobile computing device is within a prescribed distance of the one of the at least one parking locations, displaying on the mobile computing device, when the mobile computing device is within the prescribed distance, entry information comprising at least one of text, photo, audio, and video information with instructions for use of the one of the at least one parking locations, displaying on the mobile computing device, when the mobile computing device is within the prescribed distance, a first confirmation prompt, receiving a first confirmation input in response to the first confirmation prompt, receiving a tilt/inertia and speed signal from a tilt/inertia sensor of the mobile computing device, and determining, in response to the tilt/inertia and speed signal and the GPS signal, whether the vehicle is parked at the one of the at least one parking locations.

An apparatus for detecting parking of a vehicle is described. The apparatus includes a processor, memory in electronic communication with the processor, and instructions stored in the memory. The instructions are operable to cause the processor to select one of at least one parking locations, check availability of the one of the at least one parking locations for whether the one of the at least one parking locations is available, display, when the one of the at least one parking locations is available, a routing to the one of the at least one parking locations, receive, repeatedly, a GPS signal as a mobile computing device is moved to the one of the at least one parking locations, compare, repeatedly, the GPS signal to the one of the at least one parking locations, determine whether the mobile computing device is within a prescribed distance of the one of the at least one parking locations, display on the mobile computing device, when the mobile computing device is within the prescribed distance, entry information comprising at least one of text, photo, audio, and video information with instructions for use of the one of the at least one parking locations, display on the mobile computing device, when the mobile computing device is within the prescribed distance, a first confirmation prompt, receive a first confirmation input in response to the first confirmation prompt, receive a tilt/inertia and speed signal from a tilt/inertia sensor of the mobile computing device, and determine, in response to the tilt/inertia and speed signal and the GPS signal, whether the vehicle is parked at the one of the at least one parking locations.

A system for detecting parking of a vehicle is also described. The system may include a mobile computing device configured for network communication and may include a display, a GPS receiver, a sensor (e.g., a tilt/inertia sensor), and an application configured to run on the mobile computing device. The mobile computing device may be configured to select one of at least one parking locations and check availability of the one of the at least one parking locations for whether the one of the at least one parking locations is available. The mobile computing device may be configured to display, when the one of the at least one parking locations is available, a routing to the one of the at least one parking locations. The mobile computing device may also be configured to display, repeatedly, a GPS signal as the mobile computing device is moved to the one of the at least one parking locations and compare, repeatedly, the GPS signal to the one of the at least one parking locations. The mobile computing device may further be configured to determine whether the mobile computing device is within a prescribed distance of the one of the at least one parking locations and display on the mobile computing device, when the mobile computing device is within the prescribed distance, entry information comprising at least one of text, photo, audio, and video information with instructions for use of the one of the at least one parking locations. The mobile computing device may be configured to display on the mobile computing device, when the mobile computing device is within the prescribed distance, a first confirmation prompt, receive a first confirmation input in response to the first confirmation prompt, receive a tilt/inertia and speed signal from the tilt/inertia sensor of the mobile computing device, and determine, in response to said tilt/inertia and speed signal and said GPS signal, whether the vehicle is parked at the one of the at least one parking locations.

A non-transitory computer readable medium storing code for detecting parking of a vehicle is described. In some examples, the code comprises instructions executable by a processor to: select one of at least one parking locations, check availability of the one of the at least one parking locations for whether the one of the at least one parking locations is available, display, when the one of the at least one parking locations is available, a routing to the one of the at least one parking locations, receive, repeatedly, a GPS signal as a mobile computing device is moved to the one of the at least one parking locations, compare, repeatedly, the GPS signal to the one of the at least one parking locations, determine whether the mobile computing device is within a prescribed distance of the one of the at least one parking locations, display on the mobile computing device, when the mobile computing device is within the prescribed distance, entry information comprising at least one of text, photo, audio, and video information with instructions for use of the one of the at least one parking locations, display on the mobile computing device, when the mobile computing device is within the prescribed distance, a first confirmation prompt, receive a first confirmation input in response to the first confirmation prompt, receive a tilt/inertia and speed signal from a tilt/inertia sensor of the mobile computing device, and determine, in response to the tilt/inertia and speed signal and the GPS signal, whether the vehicle is parked at the one of the at least one parking locations.

Some examples of the method, apparatus, system, and non-transitory computer readable medium described above further include receiving a data set for each of the at least one parking locations wherein the data set comprises at least a location for each of the at least one parking locations, maximum vehicle size information for each of the at least one parking locations, a list of amenities for each of the at least one parking locations, at least one customer review for each of the at least one parking locations, pricing information for each of the at least one parking locations, and availability for each of the at least one parking locations. Some examples further include receiving a filtering criteria, including a vehicle size. Some examples further include filtering the data set received using the filtering criteria to define a filtered set. Some examples further include displaying the filtered set on a map. Some examples further include displaying a location of the mobile computing device on the map with the filtered set. Some examples further include receiving a selection of one of the at least one parking locations displayed on the map. Some examples further include displaying a textual description, photograph, pricing, and user reviews for the one of the at least one parking locations having been selected.

Some examples of the method, apparatus, system, and non-transitory computer readable medium described above further include receiving the vehicle size. Some examples further include storing the vehicle size in a memory in the mobile computing device. Some examples further include retrieving the vehicle size from the memory. Some examples further include comparing the vehicle size to the maximum vehicle size to determine if the vehicle will fit within the one of the at least one parking locations.

Some examples of the method, apparatus, system, and non-transitory computer readable medium described above further include launching an application on the mobile computing device. Some examples further include receiving the GPS signal. Some examples further include determining a location of the mobile computing device as a function of the GPS signal. Some examples further include transmitting the location of the mobile computing device to a server and requesting the at least one parking locations within the prescribed distance of the location of the mobile computing device.

Some examples of the method, apparatus, system, and non-transitory computer readable medium described above further include displaying an input option for an immediate booking or a future booking. Some examples further include receiving a selection of the immediate booking or the future booking. Some examples further include displaying, when the selection for the future booking is received, an input options for the future booking comprising a future date and time selection. Some examples further include receiving, when the selection for the future booking is received, an input for the future booking comprising the future date and time selection. Some examples further include displaying an input option for a duration time at the one of the at least one parking locations selected. Some examples further include receiving an input for the duration time at the one of the at least one parking locations selected.

In some examples, the checking the availability of the one of the at least one parking locations comprises checking whether the one of the at least one parking locations is available for the duration time, and, when the selection for the future booking is received, the input for the future date and time selection.

Some examples of the method, apparatus, system, and non-transitory computer readable medium described above further include determining, in response to the tilt/inertia and speed signal and the GPS signal, whether the mobile computing device is no longer in the vehicle. Some examples further include determining that the mobile computing device has returned to the vehicle after a period of time. Some examples further include displaying on the mobile computing device a second confirmation prompt. Some examples further include receiving a second confirmation response in response to the second confirmation prompt. Some examples further include transmitting the period of time having been determined to a server.

Some of the functional units described in this specification have been labeled as modules, or components, to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

While the invention herein disclosed has been described by means of specific embodiments, examples and applications thereof, numerous modifications and variations could be made thereto by those skilled in the art without departing from the scope of the invention set forth in the claims.

What is claimed is:

1. A method for detecting parking of a vehicle comprising:
   a. selecting one of at least one parking locations;
   b. checking availability of the one of the at least one parking locations for whether the one of the at least one parking locations is available;
   c. displaying, when the one of the at least one parking locations is available, a routing to the one of the at least one parking locations;
   d. receiving, repeatedly, a GPS signal as a mobile computing device is moved to the one of the at least one parking locations;
   e. comparing, repeatedly, the GPS signal to the one of the at least one parking locations;
   f. determining whether the mobile computing device is within a prescribed distance of the one of the at least one parking locations;
   g. displaying on the mobile computing device, when the mobile computing device is within the prescribed distance, entry information for how to access the one of the at least one parking locations comprising at least one of text, photo, audio, and video information, the entry information including instructions for accessing the one of the at least one parking locations;
   h. in response to displaying the entry information, displaying on the mobile computing device, when the mobile computing device is within the prescribed distance, a first confirmation prompt;
   i. receiving a first confirmation input in response to the first confirmation prompt;
   j. receiving a tilt/inertia and speed signal from a tilt/inertia sensor of the mobile computing device; and
   k. determining, in response to said tilt/inertia and speed signal and said GPS signal, whether the vehicle is parked at the one of the at least one parking locations.

2. The method for detecting parking of a vehicle of claim 1 further comprising:
   a. receiving a data set for each of said at least one parking locations wherein the data set comprises at least a location for each of said at least one parking locations, maximum vehicle size information for each of said at least one parking locations, a list of amenities for each of said at least one parking locations, at least one customer review for each of said at least one parking locations, pricing information for each of said at least one parking locations, and availability for each of said at least one parking locations;
   b. receiving a filtering criteria, including a vehicle size;
   c. filtering the data set received using the filtering criteria to define a filtered set;
   d. displaying the filtered set on a map;
   e. displaying a location of the mobile computing device on the map with the filtered set;
   f. receiving a selection of one of the at least one parking locations displayed on the map; and
   g. displaying a textual description, photograph, pricing, and user reviews for the one of the at least one parking locations having been selected.

3. The method for detecting parking of a vehicle of claim 2 further comprising:
   a. receiving the vehicle size;
   b. storing the vehicle size in a memory in the mobile computing device;
   c. retrieving the vehicle size from the memory; and
   d. comparing the vehicle size to the maximum vehicle size to determine if the vehicle will fit within the one of the at least one parking locations.

4. The method for detecting parking of a vehicle of claim 1 wherein said selecting said one of said at least one parking locations comprises:
   a. launching an app on the mobile computing device;
   b. receiving the GPS signal;
   c. determining a location of the mobile computing device as a function of the GPS signal; and
   d. transmitting the location of the mobile computing device to a server and requesting said at least one parking locations within the prescribed distance of the location of the mobile computing device.

5. The method for detecting parking of a vehicle of claim 1 further comprising:
   a. displaying an input option for an immediate booking or a future booking;
   b. receiving a selection of the immediate booking or the future booking;
   c. displaying, when the selection for the future booking is received, an input options for the future booking comprising a future date and time selection;
   d. receiving, when the selection for the future booking is received, an input for the future booking comprising the future date and time selection;
   e. displaying an input option for a duration time at said one of said at least one parking locations selected; and
   f. receiving an input for the duration time at said one of said at least one parking locations selected.

6. The method for detecting parking of a vehicle of claim 5 further comprising:
   said checking availability of said one of said at least one parking locations comprises:

a. checking whether the one of the at least one parking locations is available for the duration time, and, when the selection for the future booking is received, the input for the future date and time selection.

7. The method for detecting parking of a vehicle of claim 1 further comprising:
   a. determining, in response to said tilt/inertia and speed signal and said GPS signal, whether the mobile computing device is no longer in the vehicle;
   b. determining that the mobile computing device has returned to the vehicle after a period of time;
   c. displaying on the mobile computing device a second confirmation prompt;
   d. receiving a second confirmation response in response to the second confirmation prompt; and
   e. transmitting the period of time having been determined to a server.

8. A system for detecting parking of a vehicle comprising:
   a mobile computing device configured for network communication and comprising;
   a display;
   a GPS receiver;
   a tilt/inertia sensor; and
   an application configured to run on the mobile computing device, wherein the mobile computing device is configured to perform the steps of:
   a. selecting one of at least one parking locations;
   b. checking availability of the one of the at least one parking locations for whether the one of the at least one parking locations is available;
   c. displaying, when the one of the at least one parking locations is available, a routing to the one of the at least one parking locations;
   d. receiving, repeatedly, a GPS signal as the mobile computing device is moved to the one of the at least one parking locations;
   e. compare, repeatedly, the GPS signal to the one of the at least one parking locations;
   f. determining whether the mobile computing device is within a prescribed distance of the one of the at least one parking locations;
   g. displaying on the mobile computing device, when the mobile computing device is within the prescribed distance, entry information for how to access the one of the at least one parking locations comprising at least one of text, photo, audio, and video information, the entry information including instructions for accessing the one of the at least one parking locations;
   h. in response to displaying the entry information, displaying on the mobile computing device, when the mobile computing device is within the prescribed distance, a first confirmation prompt;
   i. receiving a first confirmation input in response to the first confirmation prompt;
   j. receiving a tilt/inertia and speed signal from the tilt/inertia sensor of the mobile computing device; and
   k. determining, in response to said tilt/inertia and speed signal and said GPS signal, whether the vehicle is parked at the one of the at least one parking locations.

9. The system for detecting parking of a vehicle of claim 8 further comprising:
   a. receiving a data set for each of said at least one parking locations wherein the data set comprises at least a location for each of said at least one parking locations, maximum vehicle size information for each of said at least one parking locations, a list of amenities for each of said at least one parking locations, at least one customer review for each of said at least one parking locations, pricing information for each of said at least one parking locations, and availability for each of said at least one parking locations;
   b. receiving a filtering criteria, including a vehicle size;
   c. filtering the data set received using the filtering criteria to define a filtered set;
   d. displaying the filtered set on a map;
   e. displaying a location of the mobile computing device on the map with the filtered set;
   f. receiving a selection of one of the at least one parking locations displayed on the map; and
   g. displaying a textual description, photograph, pricing, and user reviews for the one of the at least one parking locations having been selected.

10. The system for detecting parking of a vehicle of claim 9 further comprising:
    a. receiving the vehicle size;
    b. storing the vehicle size in a memory in the mobile computing device;
    c. retrieving the vehicle size from the memory; and
    d. comparing the vehicle size to the maximum vehicle size to determine if the vehicle will fit within the one of the at least one parking locations.

11. The system for detecting parking of a vehicle of claim 8 wherein said selecting said one of said at least one parking locations comprises:
    a. launching the application on the mobile computing device;
    b. receiving the GPS signal;
    c. determining a location of the mobile computing device as a function of the GPS signal; and
    d. transmitting the location of the mobile computing device to a server and requesting said at least one parking locations within the prescribed distance of the location of the mobile computing device.

12. The system for detecting parking of a vehicle of claim 8 further comprising:
    a. displaying an input option for an immediate booking or a future booking;
    b. receiving a selection of the immediate booking or the future booking;
    c. displaying, when the selection for the future booking is received, an input options for the future booking comprising a future date and time selection;
    d. receiving, when the selection for the future booking is received, an input for the future booking comprising the future date and time selection;
    e. displaying an input option for a duration time at said one of said at least one parking locations selected; and
    f. receiving an input for the duration time at said one of said at least one parking locations selected.

13. The system for detecting parking of a vehicle of claim 12 further comprising:
    said checking availability of said one of said at least one parking locations comprises:
    a. checking whether the one of the at least one parking locations is available for the duration time, and, when the selection for the future booking is received, the input for the future date and time selection.

14. The system for detecting parking of a vehicle of claim 8 further comprising:
    a. determining, in response to said tilt/inertia and speed signal and said GPS signal, whether the mobile computing device is no longer in the vehicle;
    b. determining that the mobile computing device has returned to the vehicle after a period of time;

c. displaying on the mobile computing device a second confirmation prompt;
d. receiving a second confirmation response in response to the second confirmation prompt; and
e. transmitting the period of time having been determined to a server.

15. A non-transitory computer readable medium storing code for detecting parking of a vehicle, the code comprising instructions executable by a processor to:
   a. select one of at least one parking locations;
   b. check availability of the one of the at least one parking locations for whether the one of the at least one parking locations is available;
   c. display, when the one of the at least one parking locations is available, a routing to the one of the at least one parking locations;
   d. receive, repeatedly, a GPS signal as a mobile computing device is moved to the one of the at least one parking locations;
   e. compare, repeatedly, the GPS signal to the one of the at least one parking locations;
   f. determine whether the mobile computing device is within a prescribed distance of the one of the at least one parking locations;
   g. display on the mobile computing device, when the mobile computing device is within the prescribed distance, entry information for how to access the one of the at least one parking locations comprising at least one of text, photo, audio, and video information, the entry information including instructions for accessing the one of the at least one parking locations;
   h. in response to displaying the entry information, display on the mobile computing device, when the mobile computing device is within the prescribed distance, a first confirmation prompt;
   i. receive a first confirmation input in response to the first confirmation prompt;
   j. receive a tilt/inertia and speed signal from a tilt/inertia sensor of the mobile computing device; and
   k. determine, in response to the tilt/inertia and speed signal and the GPS signal, whether the vehicle is parked at the one of the at least one parking locations.

16. The non-transitory computer readable medium of claim 15, the code further comprising instructions executable by the processor to:
   a. receive a data set for each of the at least one parking locations wherein the data set comprises at least a location for each of the at least one parking locations, maximum vehicle size information for each of the at least one parking locations, a list of amenities for each of the at least one parking locations, at least one customer review for each of the at least one parking locations, pricing information for each of the at least one parking locations, and availability for each of the at least one parking locations;
   b. receive a filtering criteria, including a vehicle size;
   c. filter the data set received using the filtering criteria to define a filtered set;
   d. display the filtered set on a map;
   e. display a location of the mobile computing device on the map with the filtered set;
   f. receive a selection of one of the at least one parking locations displayed on the map; and
   g. displaying a textual description, photograph, pricing, and user reviews for the one of the at least one parking locations having been selected.

17. The non-transitory computer readable medium of claim 16, the code further comprising instructions executable by the processor to:
   a. receive the vehicle size;
   b. store the vehicle size in a memory in the mobile computing device;
   c. retrieve the vehicle size from the memory; and
   d. compare the vehicle size to the maximum vehicle size to determine if the vehicle will fit within the one of the at least one parking locations.

18. The non-transitory computer readable medium of claim 15, the code further comprising instructions executable by the processor to:
   a. launch an application on the mobile computing device;
   b. receive the GPS signal;
   c. determine a location of the mobile computing device as a function of the GPS signal; and
   d. transmit the location of the mobile computing device to a server and requesting the at least one parking locations within the prescribed distance of the location of the mobile computing device.

19. The non-transitory computer readable medium of claim 15, the code further comprising instructions executable by the processor to:
   a. display an input option for an immediate booking or a future booking;
   b. receive a selection of the immediate booking or the future booking;
   c. display, when the selection for the future booking is received, an input options for the future booking comprising a future date and time selection;
   d. receive, when the selection for the future booking is received, an input for the future booking comprising the future date and time selection;
   e. display an input option for a duration time at the one of the at least one parking locations selected; and
   f. receive an input for the duration time at the one of the at least one parking locations selected.

20. The non-transitory computer readable medium of claim 19, wherein:
   the checking the availability of the one of the at least one parking locations comprises:
   a. checking whether the one of the at least one parking locations is available for the duration time, and, when the selection for the future booking is received, the input for the future date and time selection.

* * * * *